United States Patent
Nagai et al.

(10) Patent No.: US 12,362,476 B2
(45) Date of Patent: Jul. 15, 2025

(54) DATA QUALITY MONITORING ACROSS ISOLATION

(71) Applicant: Analog Devices International Unlimited Company, Limerick (IE)

(72) Inventors: Iku Nagai, Setagaya-ku (JP); Baoxing Chen, Westford, MA (US); Jonathan Ephraim David Hurwitz, Edinburgh (GB); Hidetoshi Takagi, Katori (JP); Paul Kearney, Cork City (IE); Andreas Koch, Wiesbaden (DE)

(73) Assignee: Analog Devices International Unlimited Company, Limerick (IE)

( * ) Notice: Subject to any disclaimer, the term of this patent is extended or adjusted under 35 U.S.C. 154(b) by 302 days.

(21) Appl. No.: 18/062,375

(22) Filed: Dec. 6, 2022

(65) Prior Publication Data

US 2024/0186696 A1  Jun. 6, 2024

(51) Int. Cl.
*H01Q 3/26* (2006.01)
*H01Q 3/28* (2006.01)
*G06F 11/00* (2006.01)

(52) U.S. Cl.
CPC ............ *H01Q 3/2676* (2013.01); *H01Q 3/28* (2013.01); *G06F 11/00* (2013.01); *H01Q 3/26* (2013.01)

(58) Field of Classification Search
CPC .......... H01Q 3/2676; H01Q 3/28; H01Q 3/26; G06F 11/00
See application file for complete search history.

(56) References Cited

U.S. PATENT DOCUMENTS

| | | | |
|---|---|---|---|
| 7,089,475 B1 * | 8/2006 | Krone | H04L 25/0298 375/220 |
| 7,154,940 B2 | 12/2006 | Scott et al. | |
| 7,203,224 B2 | 4/2007 | Scott et al. | |
| 8,175,087 B2 | 5/2012 | Jadus | |
| 9,379,746 B2 | 6/2016 | Kramer et al. | |
| 10,142,052 B2 | 11/2018 | Milesi et al. | |
| 10,355,602 B2 | 7/2019 | Galloway | |

OTHER PUBLICATIONS

"ADE1202: Dual Channel, Configurable, Isolated Digital Input", Analog Devices Data Sheet, (2019), 42 pgs.
"ISO1228 Eight-Channel Isolated Digital Input with Current Limit and Diagnostics", Texas Instruments, (Jun. 2023), 38 pgs.
"MAX14001 MAX14002: Configurable, Isolated 10-bit ADCs for Multi-Range Binary Inputs", Maxim Integrated Products, Inc., (2017), 340-341.
"MAX22530-MAX22532: Field-Side Self-Powered, 4-Channel, 12-bit, Isolated ADC", Analog Devices, (2021), 37 pgs.

\* cited by examiner

*Primary Examiner* — Joseph J Lauture
(74) *Attorney, Agent, or Firm* — Schwegman Lundberg & Woessner, P.A.

(57) ABSTRACT

A digital isolator includes a receiver configured to receive digital raw data at a primary side of the digital isolator. A digital-to-digital encoder is disposed at the primary side of the digital isolator. The digital-to-digital encoder is configured to create coded data. One or more digital isolators are configured to transmit the coded data across a transformer and an isolation barrier to create output coded data. A digital-to digital decoder is disposed at a secondary side of the digital isolator. The digital-to digital decoder is configured to decode the output coded data to create decoded data, determine error in coupling across the digital isolator based on the decoded data and the digital raw data, and provide an error signal based the error in coupling across the digital isolator.

21 Claims, 13 Drawing Sheets

DATA QUALITY MONITORING ACROSS ISOLATION

FIELD OF THE INVENTION

Embodiments described herein relate to digital isolator devices for transmitting signals across an isolation barrier.

BACKGROUND

In a variety of environments, signals must be transmitted between diverse sources and circuitry, while maintaining electrical isolation between the sources and the circuitry. A signal isolator is a device or circuit for transmitting logic or other signals across an electrical isolation barrier. A signal isolator may use any type of communication technology to transmit an input signal from one side of the isolation barrier to the other. For example, the communication technology may include optical, magnetic, and/or capacitive. Each side of the isolation barrier may operate at different voltages, may have a different supply voltages, and may have separate, isolated grounds.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Digital isolators provide signal coupling across different electrical signal domains on the same integrated circuit (IC) device. Each side of the digital isolators may operate at different voltages, have a different supply voltages and/or have separate, isolated grounds. There are various types of digital isolators. For example, electromagnetic digital isolators use electromagnetic coupling for transferring the data. Optical isolators use light to transmit signals between the different signal domains.

Electromagnetic digital signal isolators may be affected by electrical noise and, as such, may introduce error into the transferred data. Optical coupling isolators are less affected by electromagnetic noise, but intrinsic wear-out mechanisms can cause problems. It may be useful to determine an estimated remaining life for isolators. For example, in examples that use magnetic isolation, micro-transformers can be used as signal isolators in combination with either signal level detectors or edge detectors sending multiple pulses across the transformer upon receiving a positive input signal and sending a single pulse upon receiving a negative input signal.

Digital isolation can be used in data communication in safety and reliability applications such as industrial automation, automotive, healthcare, and aerospace/defense applications. These applications can be subject to harsh noise conditions, and several components and application-level standards can be defined to support qualifying the components and systems. To make sure that the component and system can meet those demanding standards and allow control and communication under noisy environments, component vendors and system vendors can perform noise tests to characterize the noise immunity of the data transfer. This may be accomplished by sending data from one end of the communication port to another end of the communication port across isolation, and checking the data error rate and/or eye diagrams. In safety and reliability critical systems, such as industrial power systems, for example, data communication errors may be detectable during the system up time and used to make sure the system moves to safe state in the case of catastrophic data error.

In general, digital isolators do not include error detection in the data transmission at the chip level and instead rely on external microprocessors to detect errors. Therefore, the system generally investigates if the transmitted data includes errors. In communication applications such as Ethernet, this error detection can be supported in higher layers in the protocol. In some applications such as power conversion feedback, for example, the existence in errors in the data transmission can become a safety issue. This is because the front end components used in the power stage for such as an isolated gate driver or an isolated analog-to-digital (ADC) converter may not include sophisticated communication protocols due to tight timing requirements. Data errors may cause catastrophic failure in the system in this scenario.

Even parts that use a highest noise immunity coding scheme (such as On-Off Keying, for example) may eventually fail in data transmission if the noise immunity level is increased. This causes upper system levels to adopt error detection features. For data communication between two microprocessor nodes, one can use a sophisticated packet-based communication protocol with error detection and/or correction scheme embedded in the microprocessor. This microprocessor-based error detection is not always realistic in terms cost, size, and/or time depending on the application. Part-based error detection on a bit-by bit basis allows for error detection without substantially sacrificing system resources. The part-based error detection and/or correction can be optimized such as to balance noise immunity and noise distribution (EMI) and power consumption.

Figure 1:
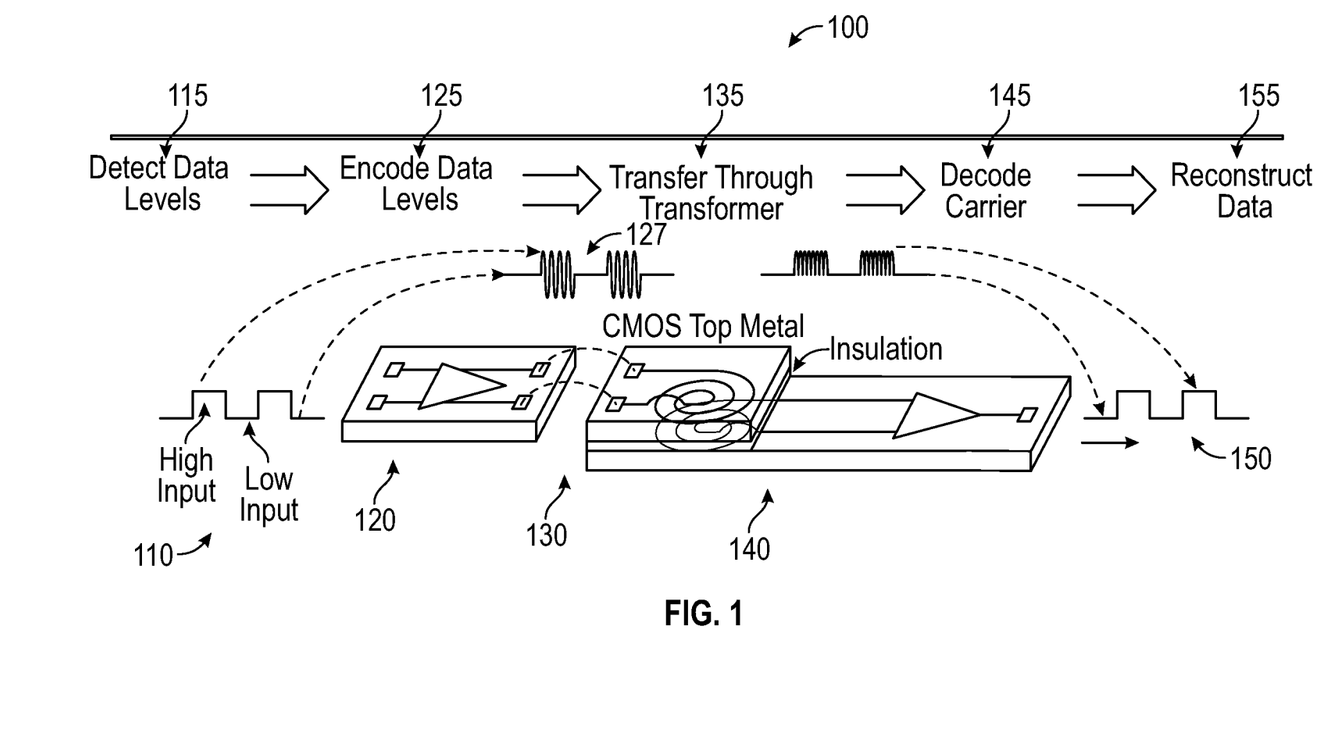
FIG. 1 illustrates an example of a digital isolator system that is configured to provide signal coupling across different electrical signal domains on the same integrated circuit (IC) device.

FIG. 1 illustrates an example of a digital isolator system 100. A first circuit 120 receives input digital data 110. Data levels are detected 115. For example, the system 100 can detect high input (i.e., 1 s) and low input (i.e., 0 s). Data levels can be encoded 125 to create analog data 127. The analog data 127 can be transferred 135 across an electrical isolation barrier 130 and through a transformer to a second circuit 140 such as via a carrier wave. The isolation barrier can include any material with electrically insulative properties. For example, the isolation barrier may include polyimide, and/or SiO2. In some examples, the isolation barrier is an air gap. The carrier wave is decoded 145 and the data is reconstructed 155. The reconstructed data should ideally be identical to the input data. In a realistic scenario, the reconstructed data can be affected by electromagnetic interference (EMI) that can introduce errors to the data as it is transferred across the isolation barrier. Adding a digital-to-digital encoder before the transmitter and digital-to-digital decoder after the receiver can enable data quality reporting for data transmission.

Figure 2A:
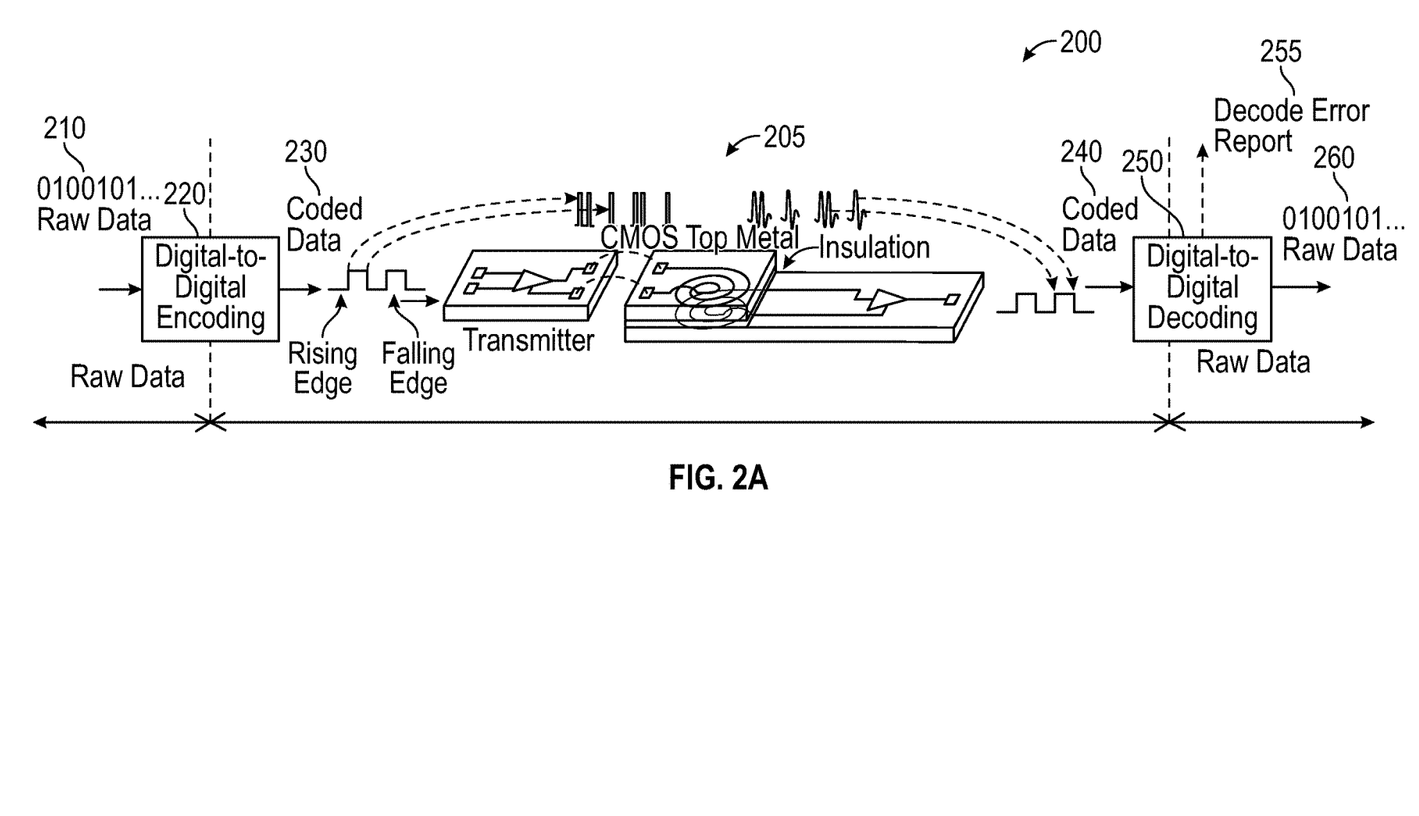
FIGS. 2A and 2B illustrates a digital isolator system having an error detection mechanism.

FIG. 2A illustrates an isolation system 200 having an error detection mechanism. In this example, the raw digital data 210 is received by a digital-to-digital encoder 220. The input encoded data 230 is transmitted to a same or similar digital isolator system 205 as shown in the example of FIG. 1. The output of the digital isolator system 205 is the output encoded data 240. The output encoded data 240 may include errors introduced by noise caused by electromagnetic interference (EMI), for example. The output encoded data 240 is decoded by a digital-to digital decoder 250. The digital-to digital decoder is configured to detect errors in the decoded data 150 and to transmit the decoded raw data 260. The digital-to digital decoder may configured to take various actions based on a number and/or type of errors detected. For example, the digital-to digital decoder be configured to provide an decoded data error report 255. In some cases, the digital-to-digital decoder is configured to provide error correction. The error correction may be configured to be carried out on an embedded integrated circuit hosting the electrical isolation and not in a separate microprocessor, for example.

Figure 2B:
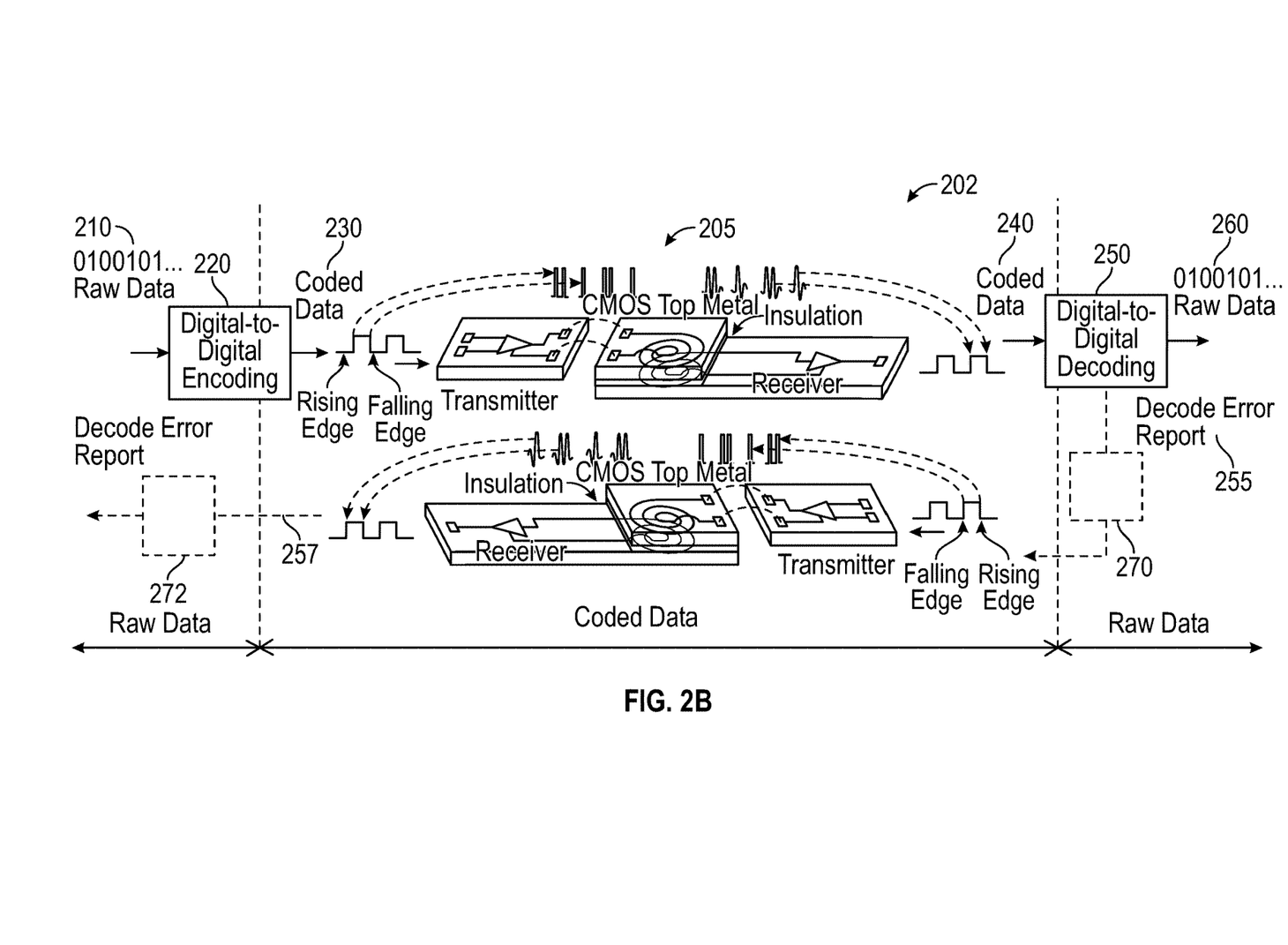

According to various examples, the decoded data error report 255 may be fed back into the left side of the digital isolator system 205 as shown in the isolation system 202 of FIG. 2B. The output data error report 257 may then be provided to a controller of the system to take action based on the output error report 257. Optionally, a first error signal digital-to-digital encoder 270 may be configured to encode the decode error report 255 before being fed back into the left side of the digital isolator system 205. Similarly, an optional second error signal digital-to-digital encoder 272 may be configured to encode the output data error report 257 before the output data error report 257 is transmitted to a controller for further action.

Figure 3A:
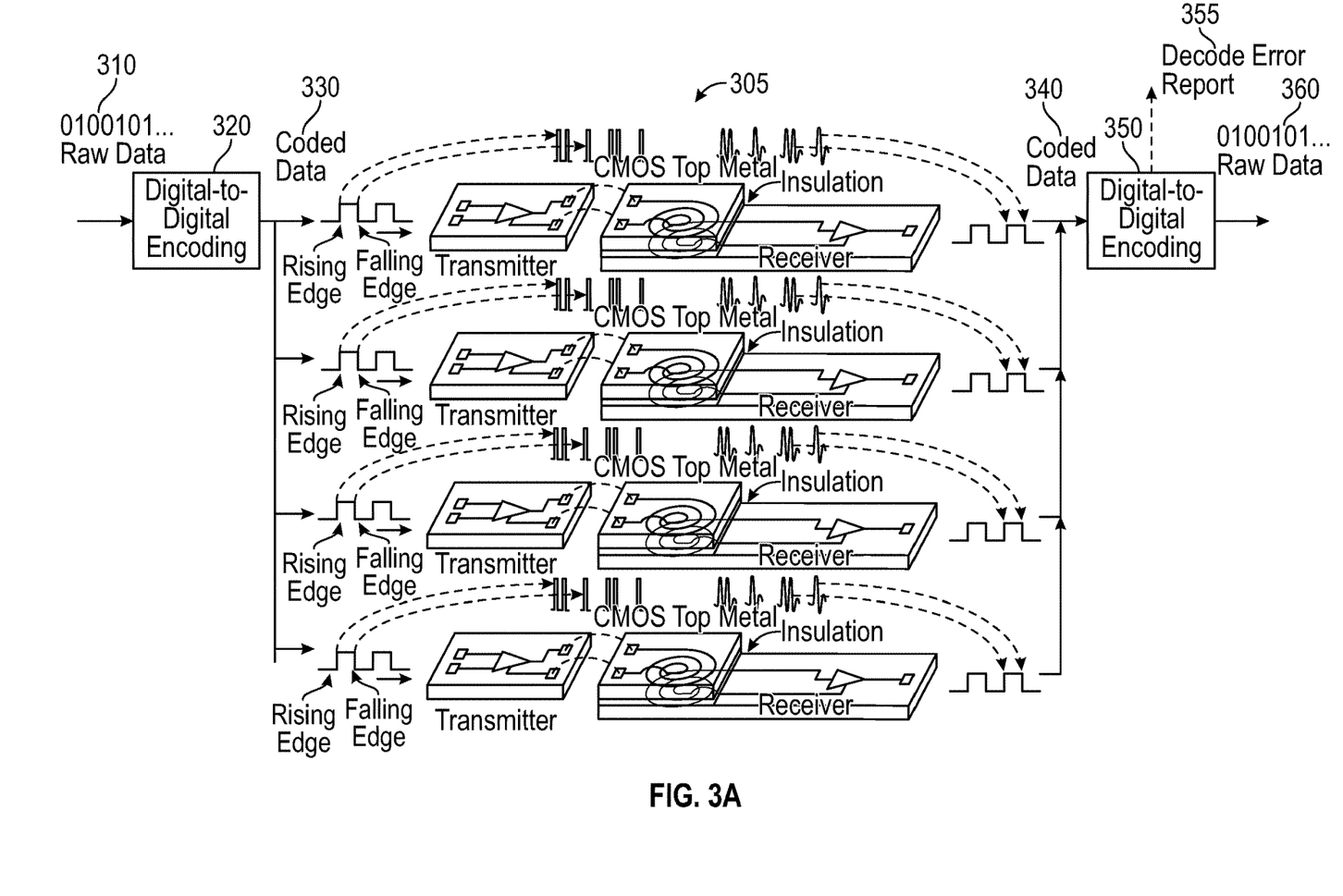
FIGS. 3A-3C shows an error detection system for multiple digital isolators connected in parallel.

FIG. 3A shows multiple isolator systems in parallel with error detection. In this example, the raw digital data 310 is received by a digital-to-digital encoder 320. The input encoded data 330 is transmitted to a plurality of parallel digital isolators 305. The output of the plurality of digital isolators 305 is the output encoded data 340. The output encoded data 340 is decoded by a digital-to digital decoder 350. The digital-to digital decoder is configured to detect errors in the decoded data and transmit the decoded raw data 360 from all of the digital isolators 305. The digital-to digital decoder may be configured to take various actions based on a number and/or type of errors detected. For example, the digital-to digital decoder can be configured to provide a decoded data error report 355.

While the example of FIG. 3A included four digital isolator systems connected in parallel, more or fewer digital isolator systems may be used. With proper digital-to-digital coding schemes, the isolation circuit part can report coded data error (caused by noise, EMI, and/or wear out, for example) while continuing data transmission without raw data error. Various types of encoding schemes may be used. For example, one or more of bi-phase encoding, Manchester encoding, and block encoding may be used.

Figure 3B:
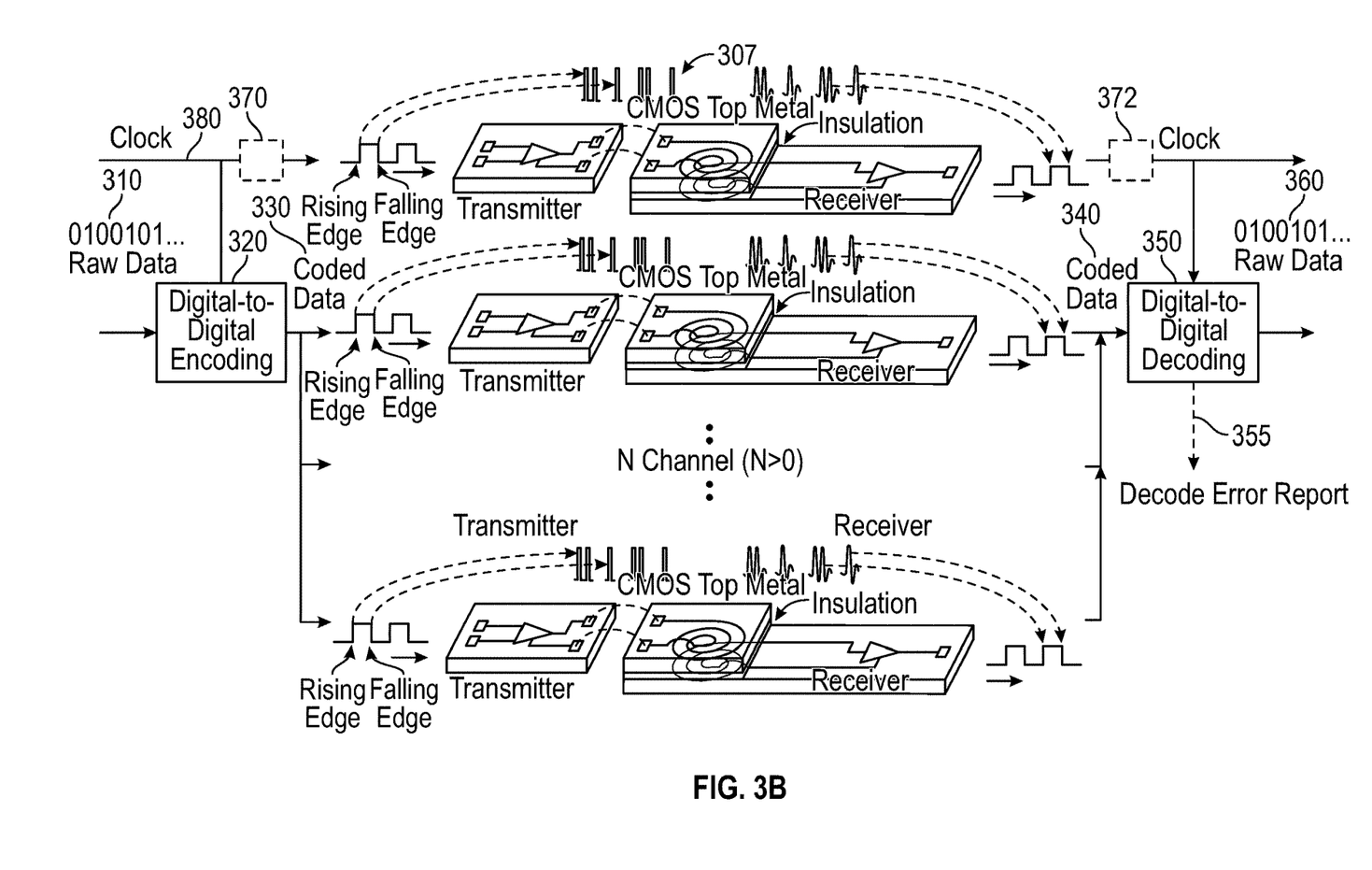

According to some examples, the plurality of parallel digital isolators 305 are coupled to a clock digital isolator 307 as shown in the example of FIG. 3B. In this example, a clock signal 330 to a first stage of the digital isolator system. The clock signal 380 is input into the digital-to-digital encoder 320 and/or the digital-to-digital decoder 350. Optionally, a first clock digital-to-digital encoder 370 may be configured to encode the clock signal 380. Similarly, an optional second clock digital-to-digital encoder 372 may be configured to encode the output clock signal 380.

Figure 3C:
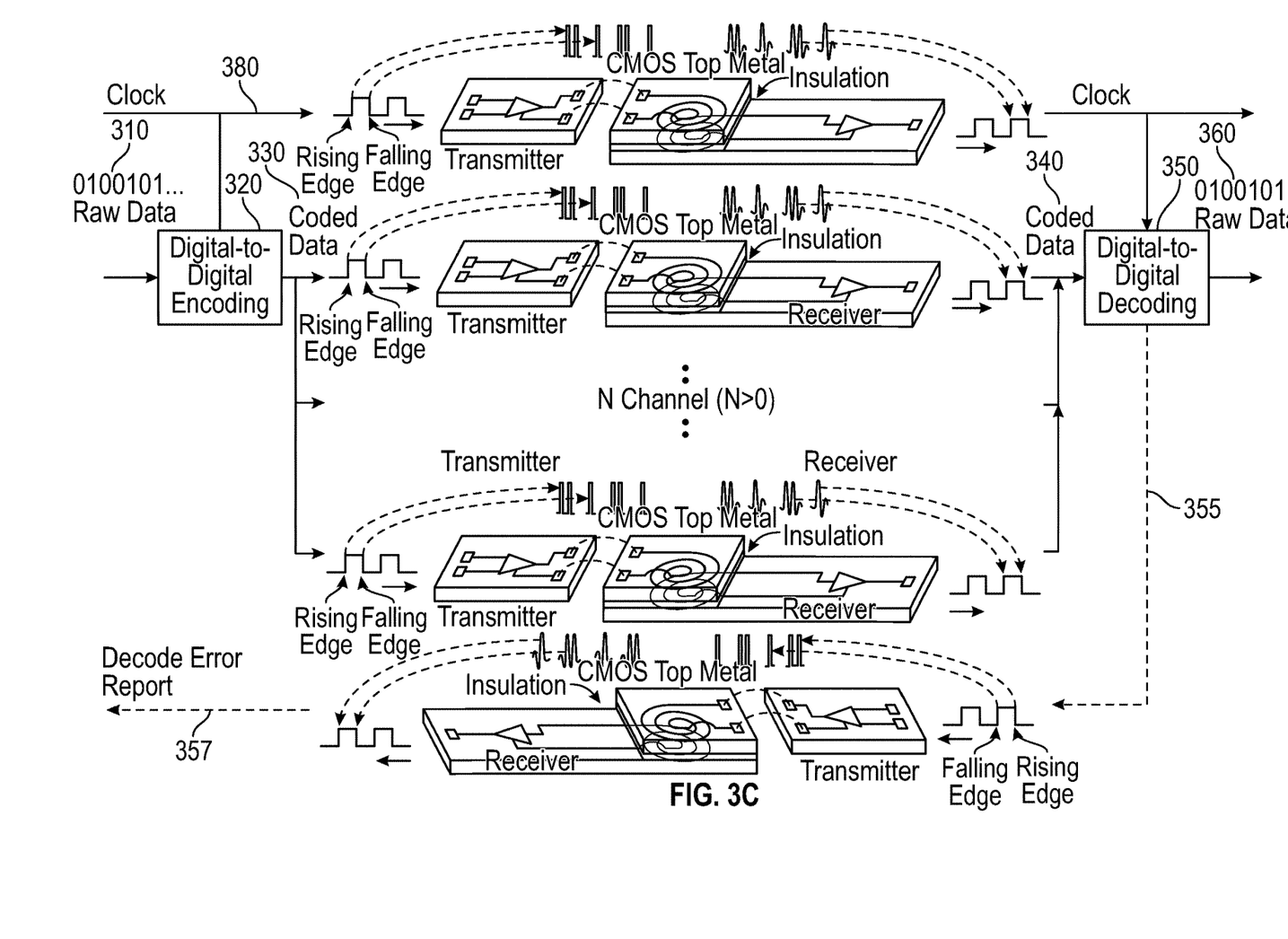

Similarly to the example of FIG. 2B, the decoded data error report 355 may be fed back into the left side of another digital isolator system as shown in FIG. 3C. The output data error report 357 may then be provided to a controller of the system to take action based on the output error report 357.

Figure 4:
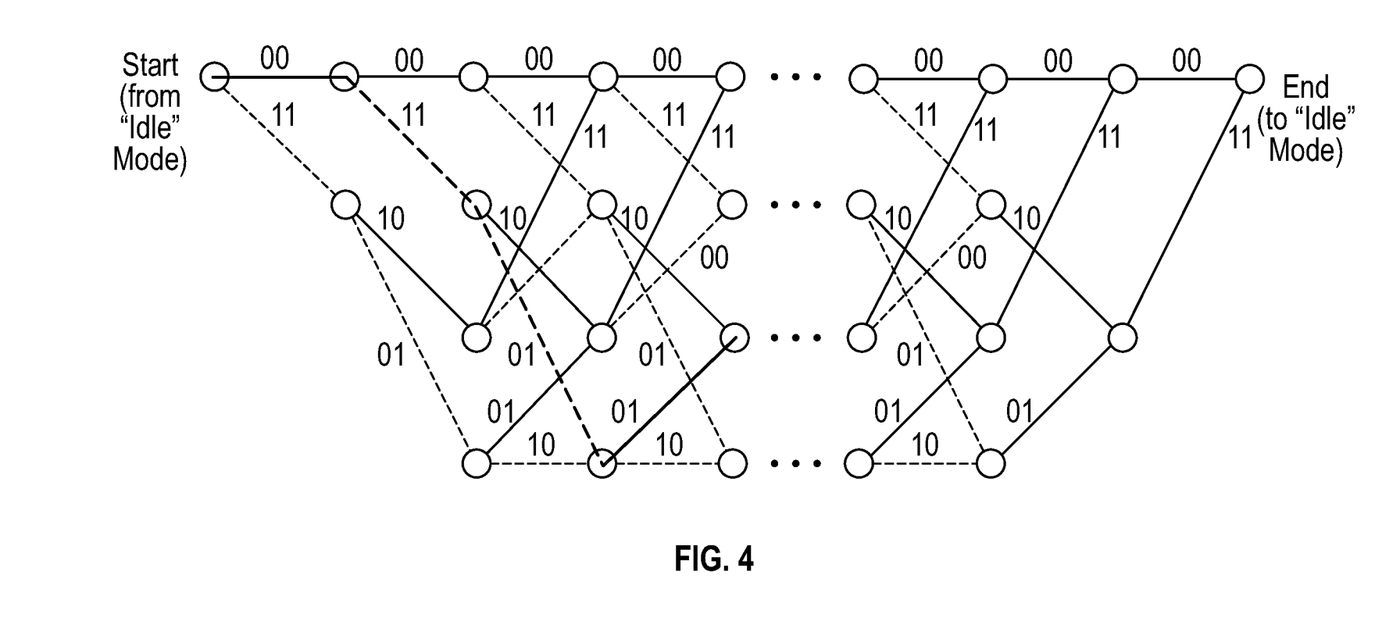
FIG. 4 illustrates a trellis diagram for an example of an encoding scheme.

FIG. 4 illustrates a trellis diagram for an example encoding scheme. The type of encoding scheme may be balanced with a desired data rate. A higher code gain coding scheme may have increased error detection and/or correction capability, but may sacrifice data rate in comparison to a lower gain coding scheme.

Reporting data transmission quality before a catastrophic error occurs can create a system level advantage. The isolator system may be configured to perform one or more of report error in data transmission, send an alert if one or more errors are detected, correct at least a portion of the data transmission errors, and stop data transmission. The alert may include a signal sent to the system controller such as a microprocessor, microcontroller, and/or an FPGA, which manages the operation of the system. The alert may cause the system to move to an appropriate state based on the alert. The alert may be used in safety critical applications, such as a gate drive and feedback for an isolated power stage, for example.

Figure 5:
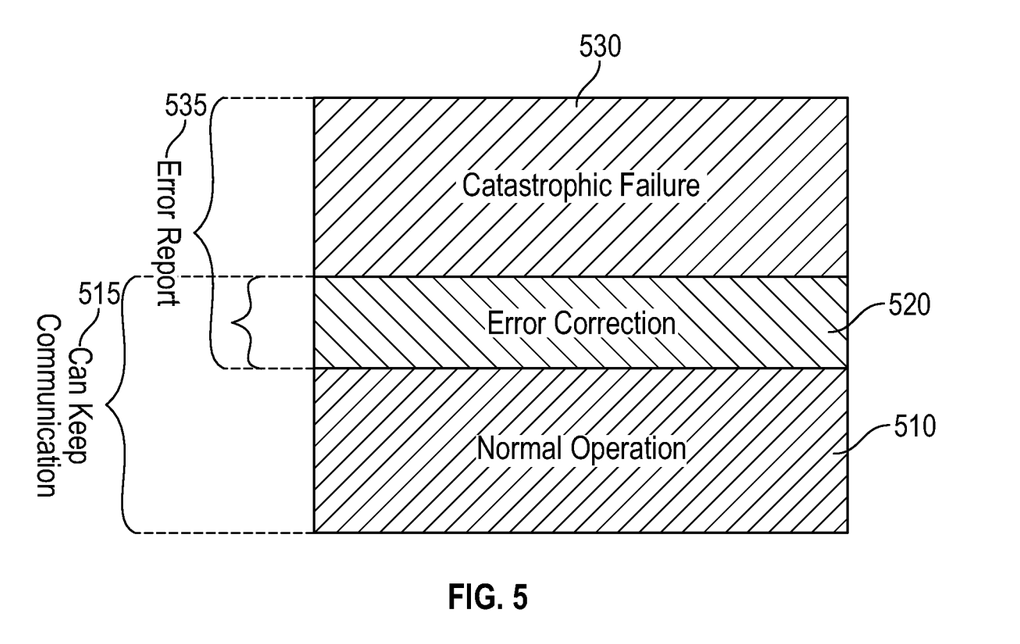
FIG. 5 illustrates an error detection scheme that is configured to take one or more actions based on a quantity and/or types of errors.

FIG. 5 illustrates an error detection scheme that is configured to take one or more actions based on a quantity and/or types of errors. There may be various levels of actions that are taken when one or more errors are detected. If the data quality is beyond a first specified threshold, the device may continue in a normal operation 510. If the data quality is between the first data quality threshold and a second data quality threshold, error correction 520 so that the device can continue communication 515. If error correction 520 is implemented an error report 535 may be transmitted. If the data quality is determined to be beyond the second specified threshold, it may be determined that a catastrophic failure 530 has occurred. Similarly to the error correction tier 520, an error report 535 may be transmitted regarding the catastrophic failure. The system can be configured to stop data transmission in the event that a catastrophic failure 530 is detected.

Figure 6:
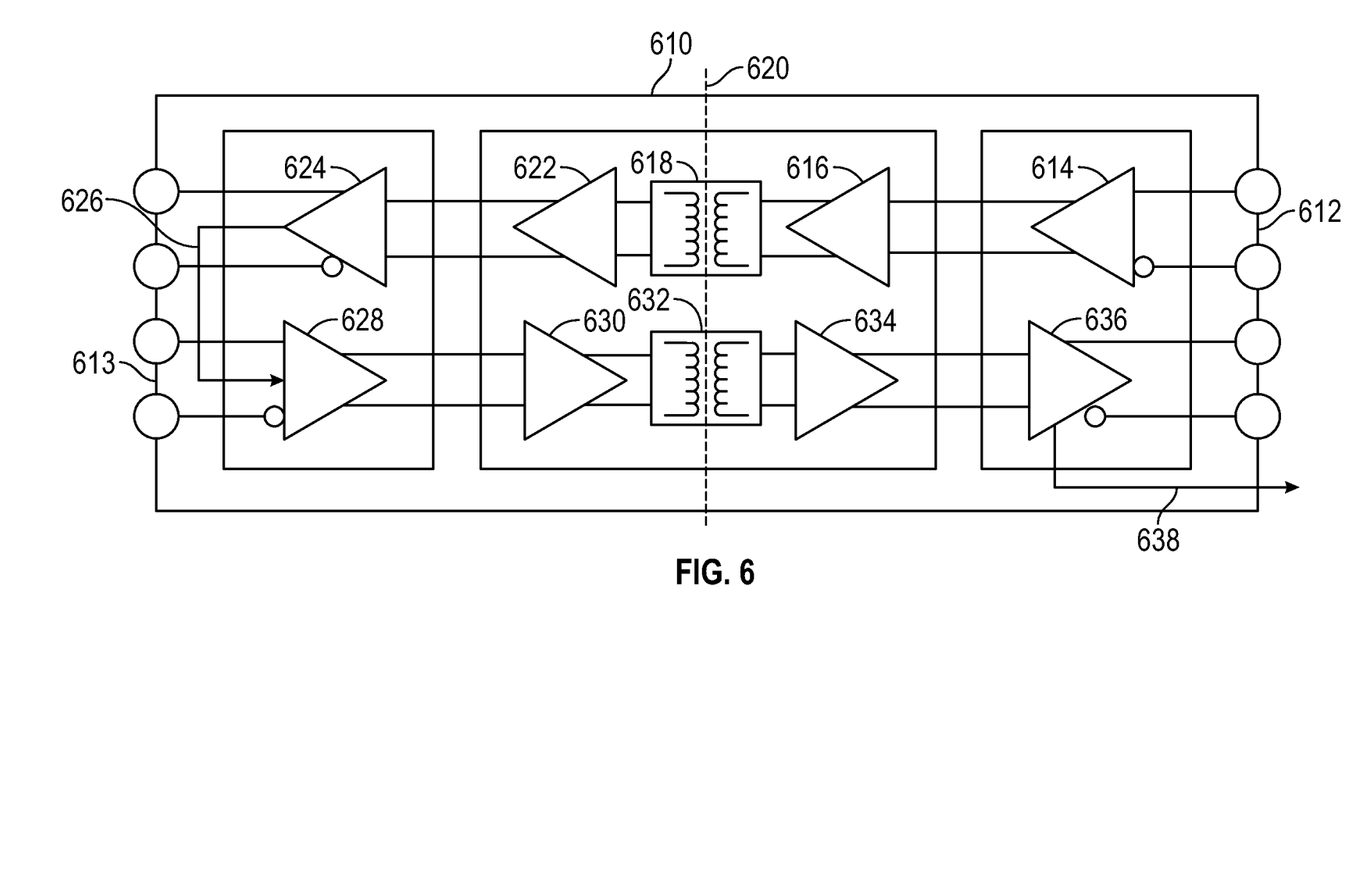
FIG. 6 shows another example of a digital isolation circuit that includes an error detection mechanism

FIG. 6 shows another example of an isolation circuit. A first signal is received from a secondary side 612 of the isolator circuit 610. The first signal may be a clock signal from a processor, for example. A first digital-to-digital encoder 614 is configured to encode the first input signal. The first encoded signal is transmitted to a first digital-to-analog encoder 616. The first encoded analog signal is then transmitted across a first transformer 618 through a isolation barrier 620. A first analog to digital decoder 622 is configured to decode the first analog signal into a first digital signal. A first digital-to digital decoder 624 is configured to decode the first digital signal and provide a first error signal 626 that may provide information about any errors that were detected when comparing the first decoded digital signal with the original input first signal.

A second signal may be provided at a primary side 613 of the isolation circuit. The second signal may be a data signal, for example. A second digital-to-digital encoder 628 is configured to encode the second input signal. The second encoded signal is transmitted to a second digital-to-analog encoder 630. The second encoded analog signal is then transmitted across a second transformer 632 through the isolation barrier 620. A second analog to digital decoder 634 is configured to decode the second analog signal into a second digital signal. A second digital-to digital decoder 636 is configured to decode the second digital signal and provide an error signal 638 that may provide information about any errors that were detected in the transmission of the first signal and/or the second signal across the isolation barrier 620. The first and/or the second error signal may be used to estimate a remaining life of the isolation circuit part. For example, the error signals may be used to estimate an amount of degradation of the isolation material in an electromagnetic isolator and/or a wear out of a light-emitting diode (LED) of an optical isolator.

The processor described herein may take different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Figure 7:
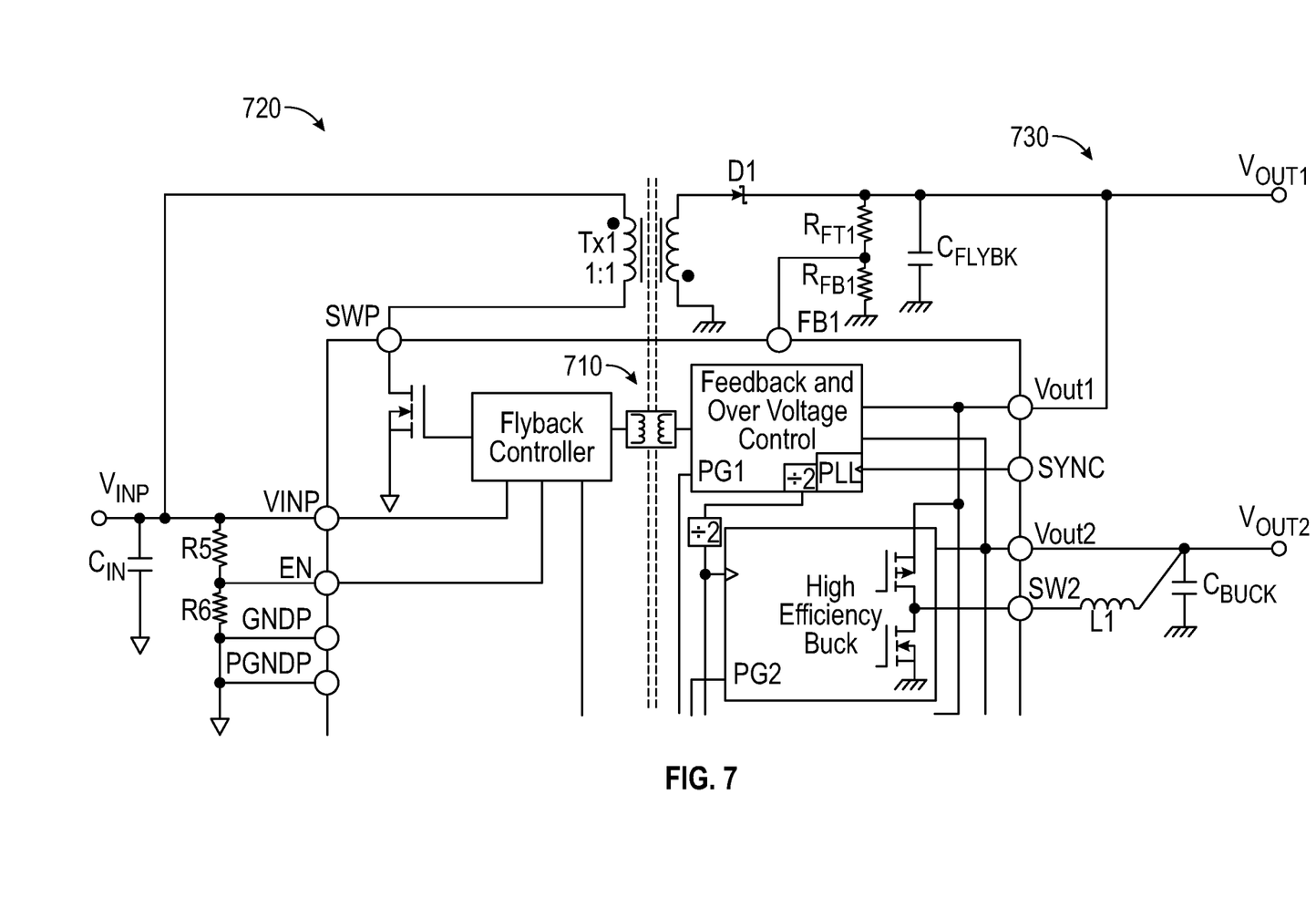
FIG. 7 illustrates a flyback switched mode power converter system with a digital isolator.

FIG. 7 illustrates a flyback switched mode power converter system with a digital isolator. In this example, a primary side 720 of the IC receives an input voltage and generates an output voltage at the secondary side 730 from the input voltage. A digital isolator 710 is disposed between the input and output voltages. In this example, isolation is used for primary voltage feedback to the secondary side 730. This voltage feedback is used to facilitate proper operation and safety measures.

Figure 8:
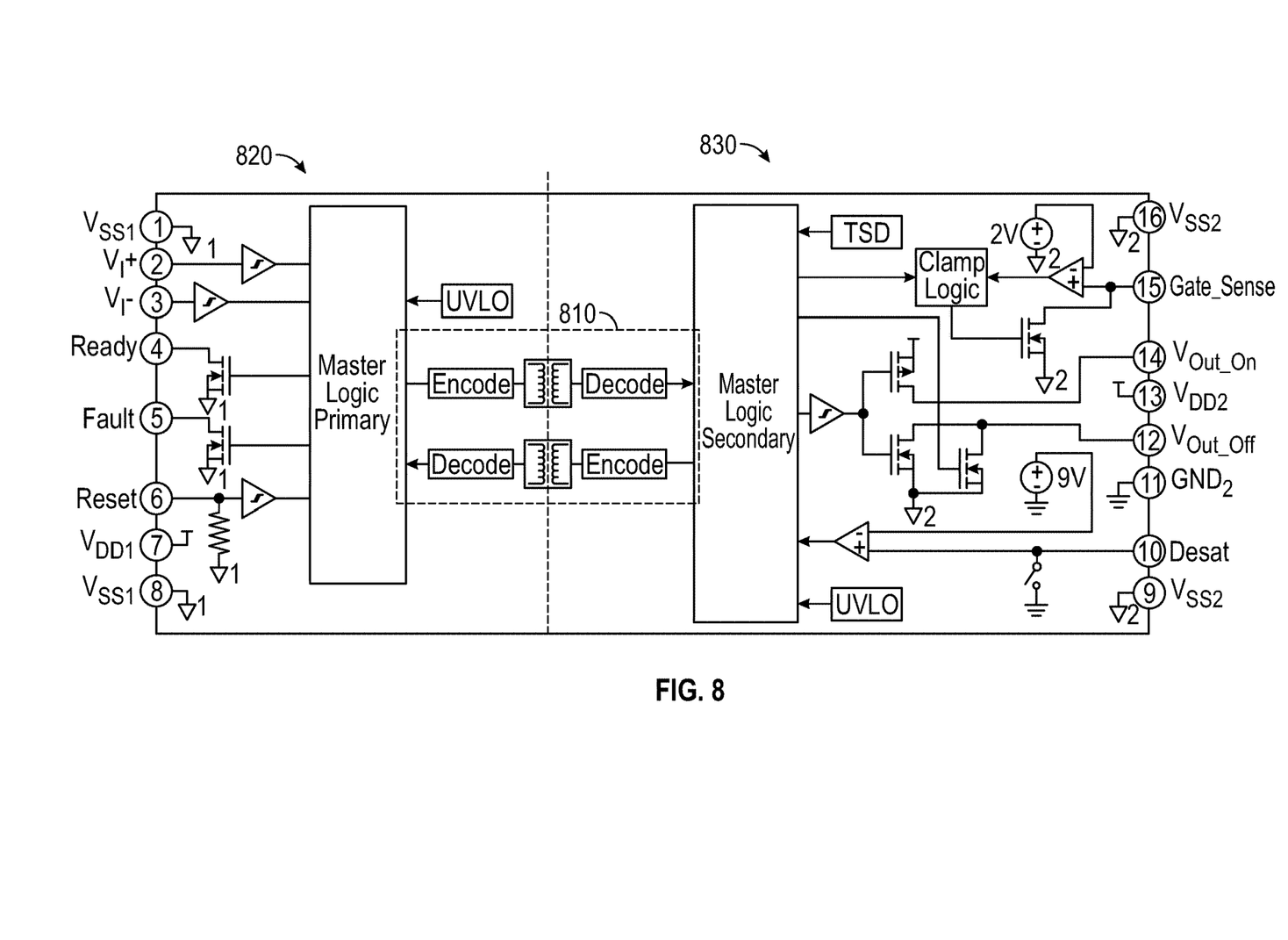
FIG. 8 shows a power amplifier system (e.g., a gate driver) with a digital isolator.

FIG. 8 shows a power amplifier system (e.g., a gate driver) with a digital isolator. In this example, a primary side 820 of the IC receives a low input power and produces a high drive current at a secondary side 830 of the IC. A digital isolator 810 is disposed between the primary side 820 and the secondary side 830. In this example isolation is used for the gate control from primary side 820 to the secondary side 830, and from the secondary side 830 to the primary side 820 for monitoring and fault reporting (such as undervoltage lockout (UVLO), for example).

Figure 9:
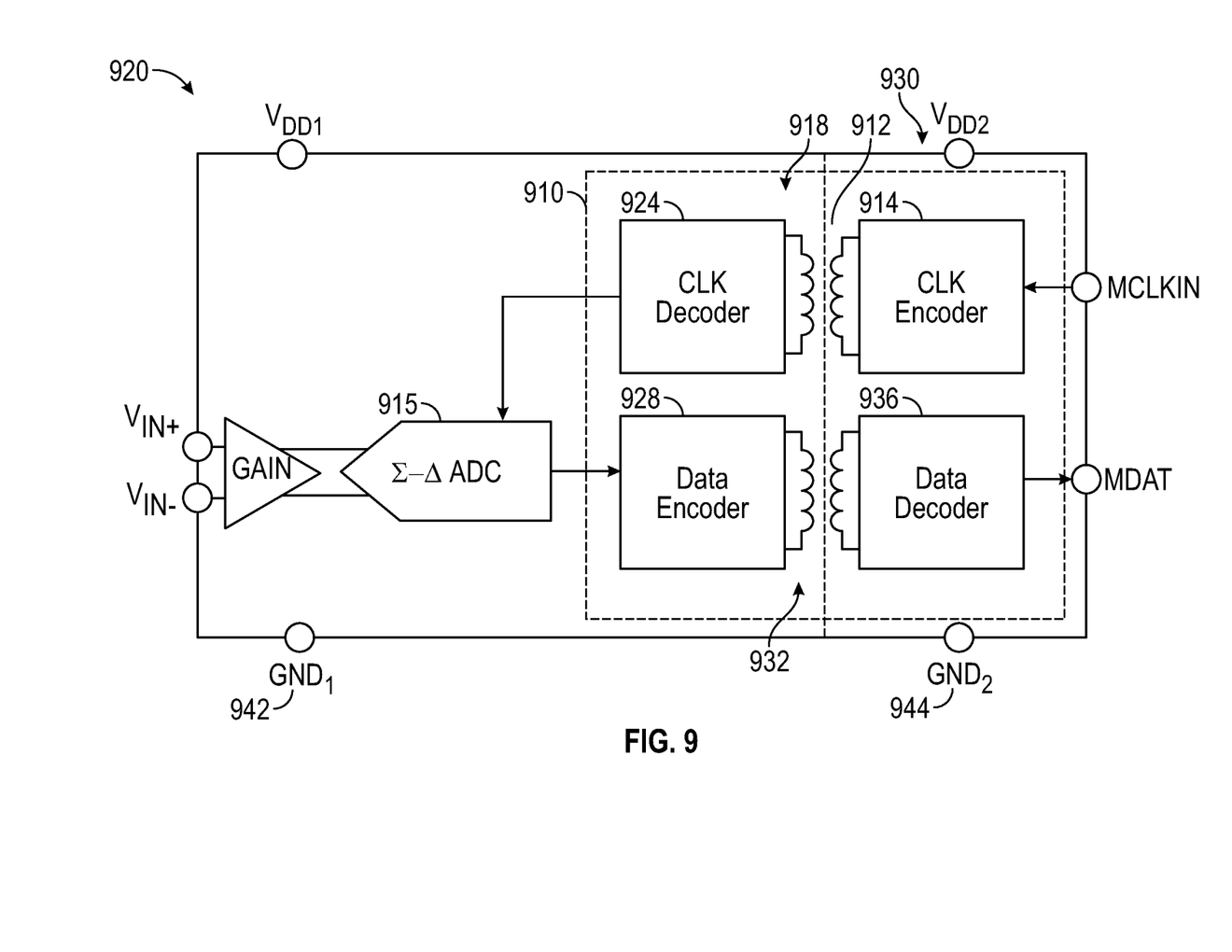
FIG. 9 illustrates an example of an isolated amplifier having a digital isolator with error detection.

FIG. 9 illustrates an example of an isolated sigma delta analog-to-digital converter. A clock signal from a processor is received at a secondary side 930 of a digital isolator 910. A clock encoder 914 is configured to encode the clock signal. The encoded clock signal is then transmitted across a first transformer 918 through an isolation barrier 918. A clock decoder 924 is configured to decode the clock signal. The clock decoder 924 may be configured to provide one or more error signals that provide information about any errors that were detected when decoding the clock signal. In this example, the digital isolator 910 may be used to minimize corrupt signals in monitoring the analog signal.

A digital data signal is received at a primary side 920 of the digital isolator 910 from an analog-to-digital converter 915. A data encoder 928 is configured to encode the data signal. The encoded data signal is then transmitted across a second transformer 932 through the isolation barrier 912. A data decoder 936 is configured to decode the data signal. The data decoder 936 may be configured to provide an error signal to a processor, for example. The primary side of the digital isolator 910 is coupled to a first ground 942 and the secondary side 930 is coupled to a second ground 944. The first ground 942 and the second ground 944 may be isolated from each other.

Figure 10:
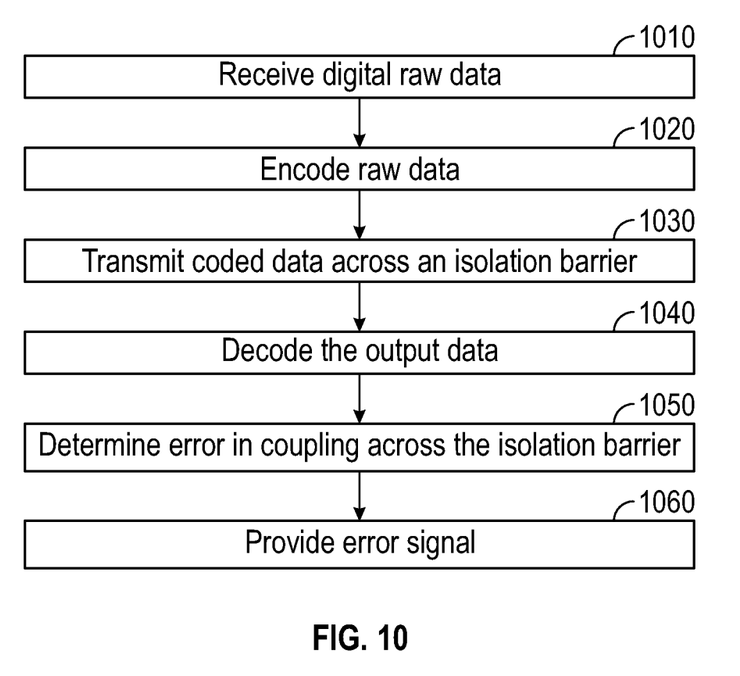
FIG. 10 illustrates a process for determining error across an electrical conductivity isolation barrier.

FIG. 10 illustrates a process for determining error across an electrical conductivity isolation barrier allowing signal coupling between first and second electrical signal domains on the same IC device. Digital raw data is received 1010 at a digital isolator circuit. The digital raw data is encoded 1020 using a digital-to-digital converter to create coded data.

The coded data is transmitted 1030 across an isolation barrier to create output coded data. The coded data can be transmitted 1030 across the isolation barrier by encoding the coded data into digital pulses to create pulsed data. The pulsed data is encoded to analog data. The coded data is reconstructed based on the analog data. Reconstructing the coded data can comprise encoding the analog data such as using one or more of Pulse Code Modulation (PCM) and On-Off keying (OOK), for example.

The output coded data is decoded 1040 using a digital-to-digital decoder to create decoded data. Error in coupling across the isolation barrier is determined 1050 based on the decoded data and the digital raw data. For example, coded data error is determined. An error signal is provided 1060 based the error in coupling across the digital isolator.

The error in coupling across the digital isolator can be determined on a bit-by-bit basis. In some examples, determining the error in coupling across the digital isolator is done substantially in real time.

Determining the error in coupling across the isolation barrier may include determining data transmission quality. For example, in response to determining that the data transmission quality is less than at least one specified criterion, an alert is generated. One or more of performing error correction, halting data transmission, and generating an alert may be done based on the data transmission quality. For example, in response to determining that the data quality is less than a first specified criterion, it can be determined that a catastrophic failure has occurred and in response to determining that the data quality is less than a second specified criterion and greater than the first specified criterion, error correction can be performed.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A method for determining error across an electrical conductivity isolation barrier allowing signal coupling between first and second electrical signal domains on a same integrated circuit (IC) device, the method comprising:
   receiving digital raw data at a digital isolator circuit;
   encoding the raw data using a digital-to-digital converter to create coded data;
   transmitting the coded data across an isolation barrier to create output coded data;
   decoding the output coded data using a digital-to-digital decoder to create decoded data;
   determining error in coupling across the isolation barrier based on the decoded data and the digital raw data;
   providing an error signal at the digital isolator circuit based on the error in coupling across the digital isolator; and
   performing error correction in response to the error signal indicating the error in coupling across the digital isolator.

2. The method of claim 1, wherein determining the error in coupling across the digital isolator comprises determining the error in coupling on a bit-by-bit basis.

3. The method of claim 1, wherein determining the error in coupling across the digital isolator comprises determining the error in coupling substantially in real time.

4. The method of claim 1, wherein:
   determining error in coupling comprises determining data transmission quality.

5. The method of claim 4, wherein in response to determining that the data transmission quality is less than at least one specified criterion, generating an alert.

6. The method of claim 4, further comprising performing one or more of halting data transmission or generating an alert based on the data transmission quality.

7. The method of claim 4, further comprising:
   in response to determining that the data quality is less than a first specified criterion, determining that there is a catastrophic failure; and
   in response to determining that the data quality is less than a second specified criterion and greater than the first specified criterion, performing error correction.

8. The method of claim 1, wherein the error comprises coded data error across the digital isolator.

9. The method of claim 1, wherein one or both of encoding the raw data using a first digital-to-digital converter and encoding the output first coded data using a second digital-to-digital converter comprises using one or more of bi-phase encoding, Manchester encoding, and block encoding.

10. The method of claim 1, wherein transmitting the coded data across a isolation barrier comprises:
   encoding the coded data into digital pulses to create pulsed data;
   encoding the pulsed data to analog data; and
   reconstructing the coded data based on the analog data.

11. The method of claim 10, wherein reconstructing the coded data based on the analog data comprises encoding the analog data using one or more of Pulse Code Modulation (PCM) and On-Off keying (OOK).

12. The method of claim 1, further comprising estimating a remaining life of the digital isolator circuit based on the error signal.

13. A digital isolator, comprising:
   a receiver configured to receive digital raw data at a primary side of the digital isolator;
   a digital-to-digital encoder at the primary side of the digital isolator, the digital-to-digital encoder configured to create coded data;
   one or more digital isolators configured to transmit the coded data across a transformer and an isolation barrier to create output coded data; and
   a digital-to digital decoder at a secondary side of the digital isolator, the digital-to digital decoder configured to:
      decode the output coded data to create decoded data;
      determine error in coupling across the digital isolator based on the decoded data and the digital raw data;
      provide an error signal based the error in coupling across the digital isolator; and
      perform error correction in response to the error signal indicating that an error is determined.

14. The digital isolator of claim 13, wherein the digital-to digital decoder is configured to determine the error in coupling on a bit-by-bit basis.

15. The digital isolator of claim 13, the digital-to digital decoder is configured to determine the error in coupling across the digital isolator substantially in real time.

16. The digital isolator of claim 13, wherein the digital-to digital decoder is configured to determine data transmission quality.

17. The digital isolator of claim 16, wherein in response to determining that the data transmission quality is less than at least one specified criterion, the digital-to-digital decoder is configured to generate an alert.

18. The digital isolator of claim 13, further comprising:
   a first ground coupled to the primary side of the digital isolator; and
   a second ground coupled to the secondary side of the digital isolator, wherein the first ground and the second side are electrically isolated from each other.

19. A system for determining error across isolation, the system comprising:
   a digital isolator, comprising:
      a receiver configured to receive digital raw data;
      a digital-to-digital encoder configured to create coded data;
      one or more digital isolators configured to transmit the coded data across a transformer and an isolation barrier to create output coded data; and
      a digital-to digital decoder configured to:
         decode the output coded data to create decoded data;

determine error in coupling across the digital isolator based on the decoded data and the digital raw data;
provide an error signal based the error in coupling across the digital isolator; and
perform error correction in response to the error signal indicating that an error is determined; and
a processor configured to receive the error signal.

20. The system of claim 19, further comprising a flyback switched mode power converter coupled to the transformer, the power converter configured to generate an output voltage from an input voltage.

21. The system of claim 19, further comprising a power amplifier coupled to the transformer.

* * * * *